United States Patent
Peng et al.

(10) Patent No.: US 11,258,372 B2
(45) Date of Patent: Feb. 22, 2022

(54) POWER EFFICIENT BRIDGE RECTIFIER IMPLEMENTED WITH SWITCHES

(71) Applicants: Lite-On Electronics (Guangzhou) Limited, Guangzhou (CN); LITE-ON Technology Corporation, Taipei (TW)

(72) Inventors: Chao Peng, Guangzhou (CN); Yan Li, Guangzhou (CN); YaYun Liu, Guangzhou (CN); XiaoQiang Li, Guangzhou (CN)

(73) Assignees: Umberg Zipser LLP, Irvine, CA (US); LITE-ON Technology Corporation, Taipei (TW)

( * ) Notice: Subject to any disclaimer, the term of this patent is extended or adjusted under 35 U.S.C. 154(b) by 92 days.

(21) Appl. No.: 16/868,995

(22) Filed: May 7, 2020

(65) Prior Publication Data

US 2021/0036630 A1    Feb. 4, 2021

(30) Foreign Application Priority Data

Jul. 29, 2019   (CN) .......................... 201910688751.X (51) Int. Cl.
*H02M 7/219*   (2006.01)
*H02M 1/32*    (2007.01)
*H02M 1/08*    (2006.01)

(52) U.S. Cl.
CPC ............. *H02M 7/219* (2013.01); *H02M 1/32* (2013.01); *H02M 1/08* (2013.01)

(58) Field of Classification Search
CPC .......... H02M 7/12; H02M 7/125; H02M 7/21; H02M 7/217; H02M 7/219; H02M 1/32; H02M 1/0054; H02M 1/0048; H02M 1/08
See application file for complete search history.

(56) References Cited

U.S. PATENT DOCUMENTS

| 8,045,350 B2 * | 10/2011 | Sells ..................... H02M 7/219 363/81 |
| 8,810,287 B2 * | 8/2014 | Hayashi ................. H03K 17/16 327/109 |

(Continued)

FOREIGN PATENT DOCUMENTS

CN    109149977 B    8/2020

OTHER PUBLICATIONS

China Patent Office, First Office Action, dated Jul. 8, 2021, 6 pages.

*Primary Examiner* — Gustavo A Rosario-Benitez
(74) *Attorney, Agent, or Firm* — Umberg Zipser LLP; Ryan Dean (57) ABSTRACT

The present invention disclosed a bridge rectifier comprising a first switching circuit, a second switching circuit, a third switching circuit, a fourth switching circuit, a first driving circuit, a second driving circuit, a third driving circuit, and a fourth driving circuit. The first driving circuit is electrically connected to the first switching circuit, the second driving circuit is electrically connected to the second switching circuit, the third driving circuit is electrically connected to the third switching circuit, the fourth driving circuit is electrically connected to the fourth switching circuit. In the disclosure, the bridge rectifier should be implemented by the combination of switch circuits with driving circuits. Such that the power dissipation of bridge rectifier could be significantly reduced to improve the function of the overall circuit due to the low impedance of the switching circuit in a closed state.

8 Claims, 5 Drawing Sheets

(56) References Cited

U.S. PATENT DOCUMENTS

| | | | | |
|---|---|---|---|---|
| 9,800,173 | B1* | 10/2017 | Chiu | H02M 7/219 |
| 10,439,490 | B2* | 10/2019 | Lin | H02M 1/4233 |
| 2003/0095423 | A1* | 5/2003 | Hirst | H02M 7/219 |
| | | | | 363/127 |
| 2009/0284303 | A1* | 11/2009 | Hu | H03K 17/74 |
| | | | | 327/434 |
| 2010/0295523 | A1* | 11/2010 | Grbovic | H02M 1/08 |
| | | | | 323/282 |
| 2010/0309701 | A1* | 12/2010 | Wu | H02M 3/33592 |
| | | | | 363/127 |
| 2011/0075460 | A1* | 3/2011 | Sells | H02M 7/219 |
| | | | | 363/127 |
| 2011/0199799 | A1* | 8/2011 | Hui | H02M 7/217 |
| | | | | 363/127 |
| 2018/0375427 | A1* | 12/2018 | Lin | H03K 17/08122 |
| 2020/0244180 | A1* | 7/2020 | Nomiyama | H02M 1/083 |
| 2020/0287382 | A1* | 9/2020 | Gao | H02H 9/045 |
| 2021/0028718 | A1* | 1/2021 | Meeks | H02M 3/1588 |

* cited by examiner

POWER EFFICIENT BRIDGE RECTIFIER IMPLEMENTED WITH SWITCHES

CROSS REFERENCE TO RELATED APPLICATION

This application claims the priority benefit of Chinese Patent Application Serial Number 201910688751.X, filed on Jul. 29, 2019, the full disclosure of which is incorporated herein by reference.

BACKGROUND

Technical Field

The present disclosure relates to a bridge rectifier, and more particularly to a bridge rectifier with multiple driving circuits.

Related Art

Power adapting device is one of the standard equipment of current electronic products. Since the electricity provided by the power supplying system is AC power and most of the electronic system uses DC power, almost electronic products need to be configured with a power adaptor to convert AC power to DC power for use. The various functions of electronic products increase the complexity of the composition, and also increases the power consumption. Therefore, the adapting efficiency of power adaptor is also required to be improved. Power adapting devices in capable of stably supplying power are helpful for stabilizing and improving the function and efficiency of electronic products.

The core component of power adapting devices is an AC-DC adapting circuit, and the bridge rectifier is a typical AC-DC adapting circuit. A diode is a typical component for the conventional bridge rectifier. However, the voltage drop and the power loss of the diode is high. Although a bridgeless power factor corrector may be used instead to be applied for high adapting efficiency purposes, the circuit design requires a significant change for the same purposes, causing an increase in cost and a reliability and stability issue of the overall operation of the circuit.

SUMMARY

The present disclosure provides a bridge rectifier without diode to solve the issue of the decreasing of reliability and stability of the bridge rectifier caused by high power dissipation of conventional bridge rectifiers.

The present disclosure provides a bridge rectifier, comprising a first switching circuit, a second switching circuit, a third switching circuit, a fourth switching circuit, a first driving circuit, a second driving circuit, a third driving circuit, and a fourth driving circuit. The first driving circuit is electrically connected to the first switching circuit. The second driving circuit is electrically connected to the second switching circuit. The third driving circuit is electrically connected to the third switching circuit. The fourth driving circuit is electrically connected to the fourth switching circuit. The first driving circuit, the second driving circuit, the third driving circuit, and the fourth driving circuit respectively comprise a first switch circuit, a second switch circuit, a first protecting circuit, a second protecting circuit, and a driving signal output terminal. The first switch circuit is electrically connected to the first protecting circuit and the second switch circuit electrically connected to the second protecting circuit and the driving signal output terminal.

Upon the bridge rectifier disclosed in the present application, it is suggested that the diode of conventional bridge rectifiers should be replaced with switching circuits in combination with driving circuit. Such that the power dissipation of bridge rectifier could be significantly reduced to improve the function of the overall circuit due to the low impedance of the switching circuit in a closed state. In addition, each of the switch components is also equipped with a corresponding driving circuit improving the reliability and stability for bridge rectifier.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

The present disclosure provides a bridge rectifier for AC-DC adapting, with applying the techniques of switching circuits in combination with driving circuit instead of diode as seen in conventional bridge rectifiers to improve the reliability and stability for bridge rectifiers.

The composition of the bridge rectifier disclosed of the present disclosure will be first described as follows.

Figure 1:
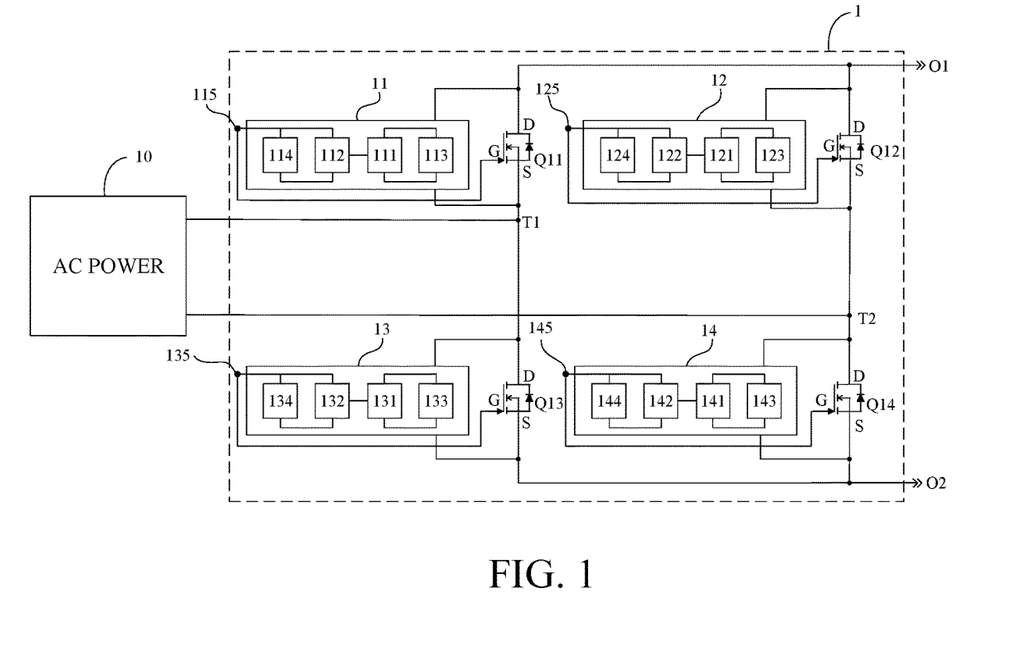
FIG. 1 is a block diagram of the bridge rectifier of one embodiment of the present disclosure.

FIG. 1 is a block diagram of the bridge rectifier of one embodiment of the present disclosure. The bridge rectifier 1 as an adapting device for an AC-DC adapting comprises a plurality of switching circuits and a plurality of driving circuits. An alternating current (AC) output from the alternating current power 10 is received by the bridge rectifier 1 and is adapted into a direct current output after being adapted by a plurality of switching circuits and a plurality of driving circuits. The AC power indicates that the current magnitude and direction change periodically along with time, and the average magnitude within one cycle is zero. Unlike DC power, the direction of AC power changes over time, while DC power does not change periodically. The frequency of the commonly used AC power source is 50 Hz or 60 Hz. As shown in FIG. 1, the AC power 10 is electrically connected to the first input terminal T1 and the second input terminal T2 of the bridge rectifier 1, and the rectified DC power are outputted from the first output terminal O1 and the second output terminal O2.

In the exemplary embodiment of FIG. 1, the bridge rectifier 1 comprises a first switching circuit Q11, a second switching circuit Q12, a third switching circuit Q13, a fourth switching circuit Q14, a first driving circuit 11, a second driving circuit 12, a third driving circuit 13 and a fourth driving circuit 14. The first driving circuit 11 is electrically connected to the first switching circuit Q11; the second driving circuit 12 is electrically connected to the second switching circuit Q12; the third driving circuit 13 is electrically connected to the third switching circuit Q13; the fourth driving circuit 14 is electrically connected to the fourth switching circuit Q14. In the present embodiment, the fact of the first switching circuit Q11, the second switching circuit Q12, the third switching circuit Q13, and the fourth switching circuit Q14 are each constituted by one switch unit is described in the following as an example.

In the present embodiment, the first switching circuit Q11, the second switching circuit Q12, the third switching circuit Q13, and the fourth switching circuit Q14 each comprises a first contact, a second contact, and a third contact, respectively. The first contact of the first switching circuit Q11 is electrically connected to the first input terminal T1, the second contact of the first switching circuit Q11 is electrically connected to the first driving circuit 11, and the third contact of the first switching circuit Q11 is electrically connected to the first output terminal O1. The first contact of the second switching circuit Q12 is electrically connected to the second input terminal T2, the second contact of the second switching circuit Q12 is electrically connected to the second driving circuit 12, and the third contact of the second switching circuit Q12 is electrically connected to the first output terminal O1. The first contact of the third switching circuit Q13 is electrically connected to the second output terminal O2, the second contact of the third switching circuit Q13 is electrically connected to the third driving circuit 13, and the third contact of the third switching circuit Q13 is electrically connected to the first input terminal T1 and the first contact of the first switching circuit Q11. The first contact of the fourth switching circuit Q14 is electrically connected to the second output terminal O2, the second contact of the fourth switching circuit Q14 is electrically connected to the fourth driving circuit 14, and the third contact of the fourth switching circuit Q14 is electrically connected to the second input terminal T2 and the first contact of the second switching circuit Q12.

In the embodiment of FIG. 1, the fact that the switch units of the first switching circuit Q11, the second switching circuit Q12, the third switching circuit Q13, and the fourth switching circuit Q14 are N-type metal oxide semiconductor field effect transistors (MOSFET) is considered an exemplary description. Thus, the first contact of the first switching circuit Q11 is a source (S), the second contact is a gate (G), and the third contact is a drain (D). The first contact of the first driving circuit 11 is electrically connected to the source (first contact) of the first switching circuit Q11. The second contact of the first driving circuit 11 is electrically connected to the drain (third contact) of the first switching circuit Q11. The third contact of the first driving circuit 11 is electrically connected to the gate (second contact) of the first switching circuit Q11. Since the second switching circuit Q12, the third switching circuit Q13, and the fourth switching circuit Q14 are all the same metal oxide semiconductor field effect transistors as the switch unit of the first switching circuit Q11, the first contacts, the second contacts, and the third contacts of the second switching circuit Q12, the third switching circuit Q13, and the fourth switching circuit Q14 are correspondingly the source S, the gate G, and the drain D. The electrical connection of the switching circuits Q12, Q13 and Q14 are similar to the first switching circuit Q11, so details are not going to be described herein again. It should be noted that the first switching circuit Q11, the second switching circuit Q12, the third switching circuit Q13, and the fourth switching circuit Q14 are respectively capable of comprising a plurality of switching units based on requirements in other embodiments.

Moreover, referring to FIG. 1, the first driving circuit 11, the second driving circuit 12, the third driving circuit 13, and the fourth driving circuit 14 respectively comprise a first switch circuit 111, 121, 131, and 141, a second switch circuit 112, 122, 132, and 142, a first protecting circuit 113, 123, 133, and 143, a second protecting circuit 114, 124, 134, and 144, and a driving signal output terminal 115, 125, 135, and 145. The first driving circuit 11 is taken as an example for description as the components of the first driving circuit 11, the second driving circuit 12, the third driving circuit 13, and the fourth driving circuit 14 are identical.

The first switch circuit 111 is electrically connected to the first protecting circuit 113 and the second switch circuit 112. The second switch circuit 112 is electrically connected to the second protecting circuit 114 and the driving signal output terminal 115. The driving signal output terminal 115 is the gate G electrically connected to the corresponding first switching circuit Q11, and outputs driving signal to the first switching circuit Q11 to open or close the first switching circuit Q11.

Figure 2:
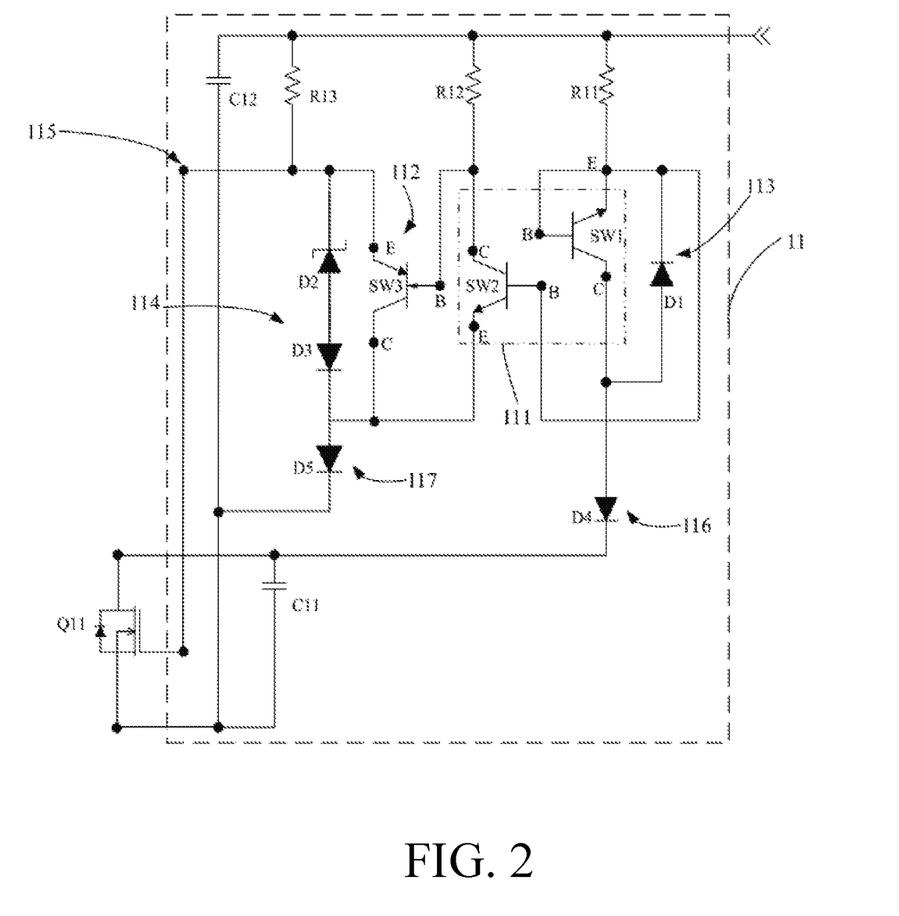
FIG. 2 is a detailed circuit diagram of the driving circuit of one embodiment of the present disclosure.

FIG. 2 is a detailed circuit diagram of the driving circuit of one embodiment of the present disclosure. Since the composition and operation of each driving circuit are exactly identical, only the first driving circuit 11 would be taken as an example for description. As shown in the figure, the first switch circuit 111 comprises a first switch unit SW1 and a second switch unit SW2. The first contact C of the first switch unit SW1 is electrically connected to the first contact of the first protecting circuit 113. The second contact B and the third contact E of the first switch unit SW1 are electrically connected to the second contact of the first protecting circuit 113. The first contact C of the second switch unit SW2 is electrically connected to the second switch circuit 112. The second contact B of the second switch unit SW2 is electrically connected to the second contact B of the first protecting circuit 113. The third contact E of the second switch unit SW2 is electrically connected to the second switch circuit 112 and the second protecting circuit 114.

The second switch circuit 112 comprises a third switch unit SW3. The first contact C of the third switch unit SW3 is electrically connected to the first contact of the second protecting circuit 114. The second contact B of the third switch unit SW3 is electrically connected to the first switch circuit 111. The third contact E of the third switch SW3 unit is electrically connected to the second contact of the second protecting circuit 114 and the driving signal output terminal 115. The driving signal output terminal 115 of the first driving circuit 11 is electrically connected to the corresponding first switching circuit Q11. Similarly, the driving signal output terminal 125 of the second driving circuit 12 is electrically connected to the second switching circuit Q12. The driving signal output terminal 135 of the third driving circuit 13 is electrically connected to the third switching circuit Q13. The driving signal output terminal 145 of the fourth driving circuit 14 is electrically connected to the fourth switching circuit Q14.

The present embodiment takes the first switching unit SW1 and the second switching unit SW2 is NPN type conductivity type Bipolar Junction Transistors (BJT), and the third switching unit SW3 is PNP conductivity type BJT as examples. Thus, the first contact C of the first switching unit SW1 is a collector, the second contact B of the first switching unit SW1 is a base, and the third contact E of the first switching unit SW1 is an emitter. Similarly, the first contact C of the second switch unit SW2 is the base, the third contact E of the second switch unit SW2 is the emitter. The first contact C of the third switch unit SW3 is the collector, the second contact B of the third switch unit SW3 is a base, and the third contact E of the third switch unit SW3 is an emitter. It should be particularly noted that the first switching unit SW1, the second switching unit SW2, and the third switching unit SW3 are described using a bipolar junction transistor, but are not limited thereto. In addition, in the embodiment as shown in FIG. 2, the first protecting circuit 113 is a diode D1, and the second protecting circuit 114 comprises a Zener diode D2 and a diode D3. The first protecting circuit 113 protects the first switch unit SW1, and the diode D3 and the Zener diode D2 of the second protecting circuit 114 respectively protect the second switch unit SW2 and the driving signal output contact 115.

Figure 3:
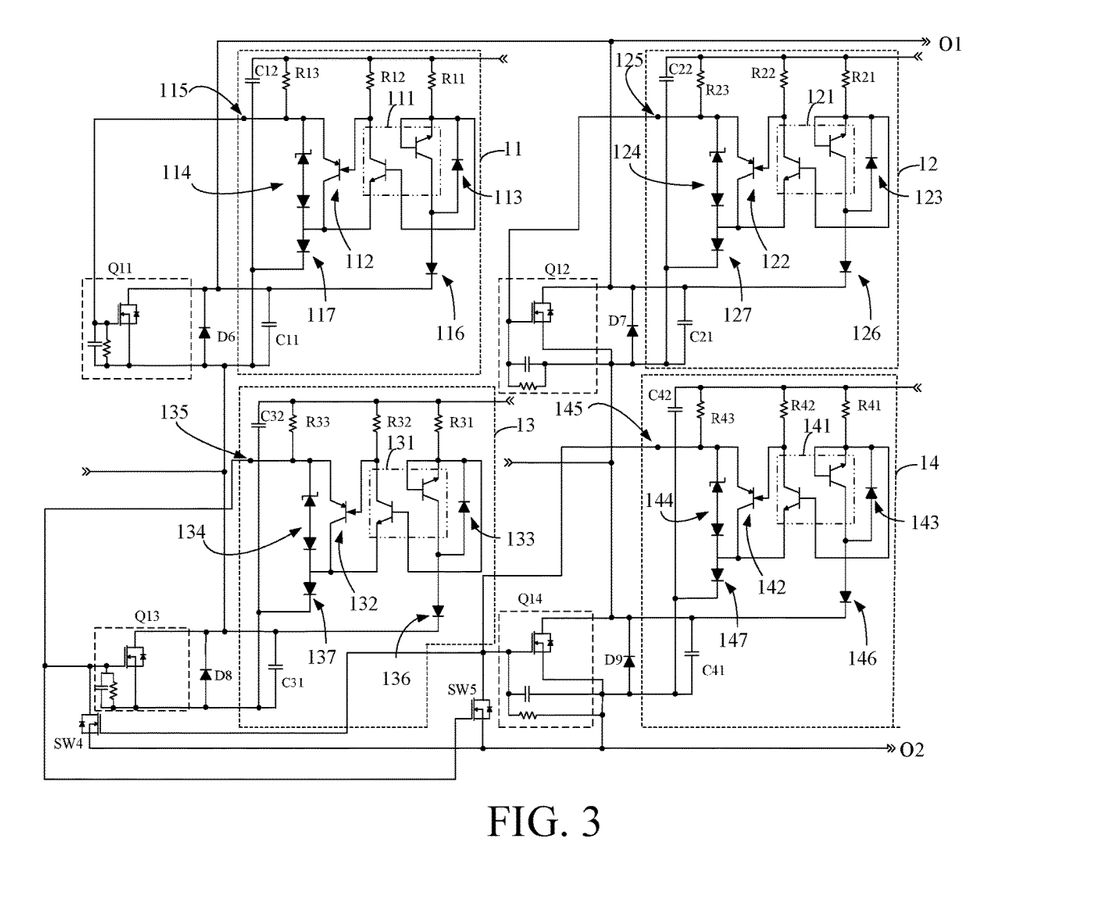
FIG. 3 is a detailed circuit diagram of the bridge rectifier circuit of one embodiment of the present disclosure.

FIG. 3 is a detailed circuit diagram of the bridge rectifier circuit of one embodiment of the present disclosure. In this embodiment, in order to prevent the bridge rectifier from malfunctioning and to maintain the regular operation of the bridge rectifier, the third driving circuit 13 further comprises a first auxiliary switch unit SW4, and the fourth driving circuit 14 further comprises a second auxiliary switch unit SW5. The first auxiliary switch unit SW4 and the second auxiliary switch unit SW5 are exemplified by metal oxide semiconductor field effect transistor herein. The first contact (source) of the first auxiliary switch unit SW4 is electrically connected to the first contact (source) of the second auxiliary switch unit SW5. The second contact (gate) of the first auxiliary switch unit SW4 is electrically connected to the driving signal output contact 145 of the fourth driving circuit 14. The third contact (drain) of the first auxiliary switch unit SW4 is electrically connected to the driving signal output terminal 135 of the third driving circuit 13. The second contact (gate) of the second auxiliary switch unit SW5 is electrically connected to the driving signal output terminal 135 of the third driving circuit 13. The third contact (drain) of the second auxiliary switch unit SW5 is electrically connected to the driving signal output terminal 145 of the fourth driving circuit 14.

By providing the first auxiliary switch unit SW4 and the second auxiliary switch unit SW5 and the connections mentioned above, the malfunction caused by the simultaneous opening of the third switching circuit Q13 and the fourth switching circuit Q14 can be avoided, and the device can be effectively prevented from being damaged and the reliability of the bridge rectifier can be improved.

As shown in FIG. 2 and FIG. 3, The first driving circuit 11, the second driving circuit 12, the third driving circuit 13, and the fourth driving circuit 14 may further comprise a plurality of impedance components R11~R13, R21 to R23, R31 to R33, and R41 to R43, third circuit protecting components 116, 126, 136, and 146, and fourth circuit protecting components 117, 127, 137, and 147, and first energy storage units C11, C21, C31, and C41, and second energy storage units C12, C22, C32, and C42. In this embodiment, the first driving circuit 11 is taken as an example for the following description. The impedance component R11 is electrically connected to the first switch circuit 111, the impedance component R12 is electrically connected to the first switch circuit 111 and the second switch circuit 112, and the impedance component R13 is electrically connected to the second switch circuit 112. The impedance component R11 is electrically connected to the second contact B and the third contact E of the first switch unit SW1. The impedance component R12 is electrically connected to the first contact C of the second switch unit SW2 and the second contact B of the third switch unit SW3. The impedance component R13 is electrically connected to the third contact E of the third switching unit SW3.

The third circuit protecting component 116 is electrically connected to the first switch circuit 111 and the first protecting circuit 113. The fourth circuit protecting component 117 is electrically connected to the second switch circuit 112 and the second protecting circuit 114. The third circuit protecting component 116 and the fourth circuit protecting component 117 are respectively diode D4 and D5. The anode of the third circuit protecting component 116 is electrically connected to the first contact C of the first switch unit SW1 and the anode of the first protecting circuit 113. The cathode of the third circuit protecting component 116 is electrically connected to the first switching circuit Q11. The anode of the fourth circuit protecting component 117 is electrically connected to the first contact C of the third switch unit SW3 and the cathode of the diode of the second protecting circuit 114. The cathode of the fourth circuit protecting component 117 is electrically connected to the first driving circuit 11.

The first contact of the first energy storage unit C11 is electrically connected to the cathode of the third circuit protecting component 116. The second contact of the first energy storage unit C11 is electrically connected to the first switching circuit Q11. The first contact of the second energy storage unit C12 is electrically connected to the plurality of impedance components R11 to R13. The second contact of the second energy storage unit C12 is electrically connected to the anode of the fourth circuit protecting component 117 and the second contact of the first energy storage unit C11.

Furthermore, the first switching circuit Q11, the second switching circuit Q12, the third switching circuit Q13, and the fourth switching circuit Q14 respectively comprise a first contact, a second contact, and a third contact. The first contact of the first switching circuit Q11 is electrically connected to the second contact of the first energy storage unit C11 of the first driving circuit 11. The second contact of the first switching circuit Q11 is electrically connected to the driving signal output terminal 115 of the first driving circuit 11. The third contact of the first switching circuit Q11 is electrically connected to the third circuit protecting component 116 of the first driving circuit 11 and the first contact of the first energy storage unit C11. The first contact of the second switching circuit Q12 is electrically connected to the second contact of the first energy storage unit C21 of the second driving circuit 12. The second contact of the second switching circuit Q12 is electrically connected to the driving signal output terminal 125 of the second driving circuit 12. The third contact of the second switching circuit Q12 is electrically connected to the third circuit protecting component 126 of the second driving circuit 12 and the first contact of the first energy storage unit C21. The first contact of the third switching circuit Q13 is electrically connected to the second contact of the first energy storage unit C31 of the third driving circuit 13. The second contact of the third switching circuit Q13 is electrically connected to the driving signal output terminal 135 of the third driving circuit 13. The third contact of the third switching circuit Q13 is electrically connected to the third circuit protecting component 136 of the third driving circuit 13 and the first contact of the first energy storage unit C31. The first contact of the fourth switching circuit Q14 is electrically connected to the second contact of the first energy storage unit C41 of the fourth driving circuit 14. The second contact of the fourth switching circuit Q14 is electrically connected to the driving signal output terminal 145 of the fourth driving circuit 14. The third contact of the fourth switching circuit Q14 is electrically connected to the third circuit protecting component 146 of the fourth driving circuit 14 and the first contact of the first energy storage unit C41.

As shown in FIG. 3, The bridge rectifier 1 further comprises a first protecting unit D6, a second protecting unit D7, a third protecting unit D8, and a fourth protecting unit D9. The first protecting unit D6 is electrically connected to the first switching circuit Q11. The second protecting unit D7 is electrically connected to the second switching circuit Q12. The third protecting unit D8 is electrically connected to the third switching circuit Q13. The fourth protecting unit D9 is electrically connected to the fourth switching circuit Q14. The fact that the first protecting unit D6, the second protecting unit D7, the third protecting unit D8, and the fourth protecting unit D9 are respectively diode is taken as an example for this embodiment. The first protecting unit D6 and the first switching circuit Q11 are electrically connected in a reversed parallel form. The second protecting unit D7 and the second switching circuit Q12 are electrically connected in a reversed parallel form. The third protecting unit D8 and the third switching circuit Q13 are electrically connected in a reversed parallel form. The fourth protecting unit D9 and the fourth switching circuit Q14 are electrically connected in a reversed parallel form. The first protecting unit D6 is electrically connected to the first energy storage units C11. The second protecting unit D7 is electrically connected to the second energy storage units C12. The third protecting unit D8 is electrically connected to the third energy storage units C13. The fourth protecting unit D6 is electrically connected to the fourth energy storage units C11. By providing the first protecting unit D6, the second protecting unit D7, the third protecting unit D8, and the fourth protecting unit D9 and the connection mentioned above, the damage to the first switching circuit Q11, the second switching circuit Q12, the third switching circuit Q13, and the fourth switching circuit Q14 due to the surge current can be avoided.

The following describes how the embodiment of bridge rectifier works. When the AC power 10 outputs positive half cycle AC power, the bridge rectifier receives the positive half cycle AC power. The first switching circuit Q11 and the third switching circuit Q13 would close according to the driving signals outputted by the first driving circuit 11 and the third driving circuit 13, and the second switching circuit Q12 and the fourth switching circuit Q14 would open in the meantime. When the bridge rectifier receives the negative half cycle AC power, the first switching circuit Q11 and the third switching circuit Q13 are turned open, and the second switching circuit Q12 and the fourth switching circuit Q14 are turned close according to the driving signals output by the second driving circuit 12 and the fourth driving circuit 14.

Figure 4:
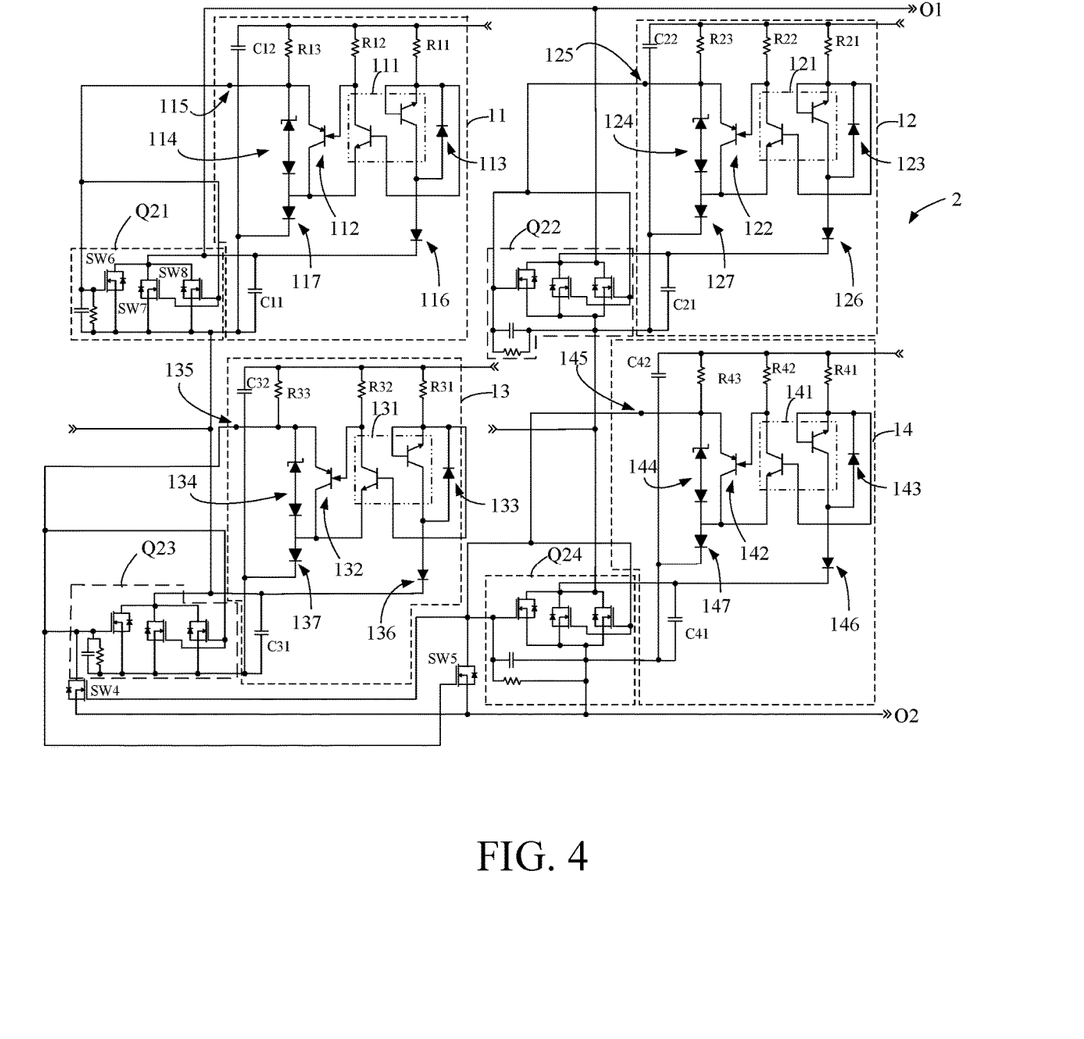
FIG. 4 is a detailed circuit diagram of the bridge rectifier circuit of another embodiment of the present disclosure.

FIG. 4 is a detailed circuit diagram of the bridge rectifier circuit of another embodiment of the present disclosure, the switching circuit of the embodiment in FIG. 4 is composed of a plurality of switching components.

The switching circuit of the embodiment in FIG. 3 is composed of a plurality of switching components. Three metal oxide semiconductor field effect transistors are used in the embodiment. The conductor type of each metal oxide semiconductor field effect transistor is identical.

In the embodiment of FIG. 3, the AC power 10 is connected to the first input terminal T1 and the second input terminal T2 of the bridge rectifier 1. The bridge rectifier 2 comprises a first switching circuit Q21, a second switching circuit Q22, a third switching circuit Q23, a fourth switching circuit Q24, a first driving circuit 11, a second driving circuit 12, a third driving circuit 13, and a fourth Drive circuit 14, as shown in FIG. 4. The first switching circuit Q21, the second switching circuit Q22, the third switching circuit Q23, and the fourth switching circuit Q24 respectively comprise a first contact, a second contact, and a third contact. The first driving circuit 11, the second driving circuit 12, the third driving circuit 13, and the fourth driving circuit 14 also respectively comprise a first contact, a second contact, and a third contact. The connection between the switching circuits and the driving circuits are identical to the foregoing embodiment. The composition and the connections of the first driving circuit 11, the second driving circuit 12, the third driving circuit 13, and the fourth driving circuit 14 are identical to those in the foregoing embodiment, and details would not be described again herein.

In this embodiment, the first switching circuit Q21, the second switching circuit Q22, the third switching circuit Q23, and the fourth switching circuit Q24 are composed of a plurality of switching circuits. A plurality of metal oxide semiconductor field effect transistors (MOSFETs) may be introduced, and the conductor type of each metal oxide semiconductor field effect transistor is identical.

Taking the first switching circuit Q21 as an example, it is composed of three metal oxide semiconductor field effect transistors. The first switching circuit Q21 comprises a first transistor SW6, a second transistor SW7, and a third transistor SW8. The first contacts of the first transistor SW6, the second transistor SW7, and the third transistor SW8 is a source, the second contacts of the first transistor SW6, the second transistor SW7, and the third transistor SW8 is a drain, and the third contacts of the first transistor SW6, the second transistor SW7, and the third transistor SW8 is a gate. The first contact of the first driving circuit 11 is electrically connected to the source (first contact) of the first transistor SW6. The second contact of the first driving circuit 11 is electrically connected to the drain (second contact) of the first transistor SW6. The third contact of the first driving circuit 11 is electrically connected to the gate (third contact) of the first transistor SW6. The source of the second transistor SW7 is electrically connected to the source of the first transistor SW6. The drain of the second transistor SW7 is electrically connected to the drain of the first transistor SW6. The gate of the second transistor SW7 is electrically connected to the gate of the first transistor SW6. The source of the third transistor SW8 is electrically connected to the source of the first transistor SW6. The drain of the third transistor SW8 is electrically connected to the drain of the first transistor SW6. In addition, the first transistor SW6 is further coupled to an RC parallel circuit. The composition, operation, and connection of the second switching circuit Q22, the third switching circuit Q23, and the fourth switching circuit Q24 are similar to those of the first switching circuit Q21, so they would not be described again herein.

In the embodiment of FIG. 4, In order to prevent the first switching circuit Q21, the second switching circuit Q22, the third switching circuit Q23, and the fourth switching circuit Q24 from being damaged by the surge current, the first protecting unit D6, the second protecting unit D7, the third protecting unit D8, and the fourth protecting unit D9 as shown in FIG. 3 can also be introduced as protection in bridge rectifier.

When the AC power 10 outputs positive half cycle AC power, the bridge rectifier receives the positive half cycle AC power. The first driving circuit 11 and the third driving circuit 13 output driving signals to drive the first switching circuit Q21 and the third switching circuit Q23. The first switching circuit Q21 and the third switching circuit Q23 are closed, and the second switching circuit Q22 and the fourth switching circuit Q24 are opened. When the bridge rectifier receives the negative half cycle AC power, the second driving circuit 12 and the fourth driving circuit 14 output driving signals to drive the second switching circuit Q22 and the fourth switching circuit Q24. The second switching circuit Q22 and the fourth switching circuit Q24 are closed, and the first switching circuit Q21 and the third switching circuit Q23 are opened.

Figure 5:
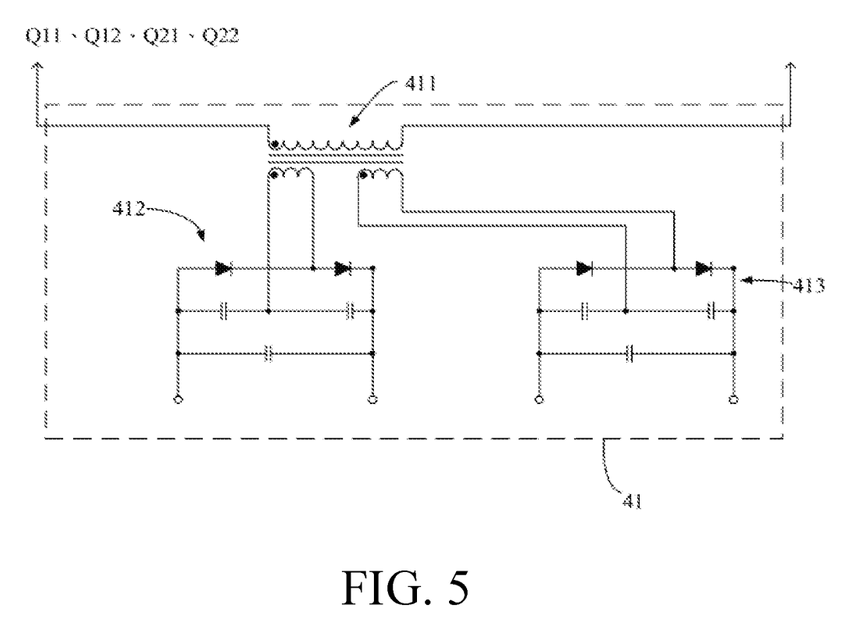
FIG. 5 is a circuit diagram of the operating voltage generating circuit of the bridge rectifier of the present disclosure.

FIG. 5 is a circuit diagram of the operating voltage generating circuit of the bridge rectifier of the present disclosure. As shown in the figure, the bridge rectifier may further comprise an operating voltage generating circuit 41, and the operating voltage generating circuit 41 of the bridge rectifier of the present embodiment can also be applied to the foregoing embodiments of FIGS. 1 to 4. The operating voltage generating circuit 41 comprises a transformer 411, a first operating voltage generating component 412, and a second operating voltage generating component 413. In this embodiment, the primary side of the transformer 411 is electrically connected to the first switching circuits Q11 and Q21 and the second switching circuits Q12 and Q22 of the foregoing embodiment. The secondary side of the transformer 411 is electrically connected to the first operating voltage generating component 412 and the second operating voltage generating component 413. The first operating voltage generating component 412 is electrically connected to the first driving circuit 11 and provides an operating voltage required by the first driving circuit 11. The second operating voltage generating component 413 is electrically connected to the second driving circuit 12 and provides an operating voltage required by the second driving circuit 12.

In summary, in the bridge rectifier disclosed in the present application, it is suggested that the diode for conventional bridge rectifiers should be replaced with switch circuits in combination with driving circuits. Such that the power dissipation of bridge rectifier could be significantly reduced to improve the function of the overall circuit due to the low impedance of the switching circuit in a closed state. In addition, each of the switch components is also equipped with a corresponding driving circuit improving the reliability and stability for bridge rectifier.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A bridge rectifier, comprising:
a first switching circuit;
a second switching circuit;
a third switching circuit;
a fourth switching circuit;
a first driving circuit;
a second driving circuit;
a third driving circuit; and
a fourth driving circuit;
wherein the first driving circuit is electrically connected to the first switching circuit; the second driving circuit is electrically connected to the second switching circuit; the third driving circuit is electrically connected to the third switching circuit; the fourth driving circuit is electrically connected to the fourth switching circuit; the first driving circuit, the second driving circuit, the third driving circuit, and the fourth driving circuit respectively comprise a first switch circuit, a second switch circuit, a first protecting circuit, a second protecting circuit, and a driving signal output terminal;

wherein the first switch circuit is electrically connected to the first protecting circuit and the second switch circuit electrically connected to the second protecting circuit and the driving signal output terminal;

the first switch circuit comprises a first switch unit and a second switch unit;

a first contact of the first switch unit is electrically connected to a first contact of the first protecting circuit;

a second contact and a third contact of the first switch unit are electrically connected to a second contact of the first protecting circuit;

a first contact of the second switch unit is electrically connected to the second switch circuit;

a second contact of the second switch unit is electrically connected to a second contact of the first protecting circuit; and a third contact of the second switch unit is electrically connected to the second switch circuit and the second protecting circuit.

2. The bridge rectifier according to claim 1, wherein the second switch circuit comprises:

a third switch unit;

wherein a first contact of the third switch unit is electrically connected to a first contact of the second protecting circuit; a second contact of the third switch unit is electrically connected to the first switch circuit; a third contact of the third switch unit is electrically connected to a second contact of the second protecting circuit and the driving signal output terminal.

3. The bridge rectifier according to claim 1, wherein the driving signal output terminal of the first driving circuit is electrically connected to the first switching circuit; the driving signal output terminal of the second driving circuit is electrically connected to the second switching circuit; the driving signal output terminal of the third driving circuit is electrically connected to the third switching circuit; the driving signal output terminal of the fourth driving circuit is electrically connected to the fourth switching circuit.

4. The bridge rectifier according to claim 1, wherein the first driving circuit, the second driving circuit, the third driving circuit, and the fourth driving circuit respectively comprise:

a plurality of impedance components electrically connected to the first switch circuit and the second switch circuit, respectively;

a third circuit protecting component electrically connected to the first switch circuit and the first protecting circuit;

a fourth circuit protecting component electrically connected to the second switch circuit and the second protecting circuit;

a first energy storage unit electrically connected to the third circuit protecting component; and a second energy storage unit electrically connected to the fourth circuit protecting component and the first energy storage unit.

5. The bridge rectifier according to claim 4, wherein a first contact of the first switching circuit is electrically connected to the first energy storage unit of the first driving circuit; a second contact of the first switching circuit is electrically connected to the driving signal output terminal of the first driving circuit; a third contact of the first switching circuit is electrically connected to the third circuit protecting component of the first driving circuit and the first energy storage unit; a first contact of the second switching circuit is electrically connected to the first energy storage unit of the second driving circuit; a second contact of the second switching circuit is electrically connected to the driving signal output terminal of the second driving circuit; a third contact of the second switching circuit is electrically connected to the third circuit protecting component of the second driving circuit and the first energy storage unit; a first contact of the third switching circuit is electrically connected to the first energy storage unit of the third driving circuit; a second contact of the third switching circuit is electrically connected to the driving signal output terminal of the third driving circuit; a third contact of the third switching circuit is electrically connected to the third circuit protecting component of the third driving circuit and the first energy storage unit; a first contact of the fourth switching circuit is electrically connected to the first energy storage unit of the fourth driving circuit; a second contact of the fourth switching circuit is electrically connected to the driving signal output terminal of the fourth driving circuit; a third contact of the fourth switching circuit is electrically connected to the third circuit protecting component of the fourth driving circuit and the first energy storage unit.

6. The bridge rectifier according to claim 1, wherein the third driving circuit comprises:

a first auxiliary switching unit;

the fourth driving circuit comprises:

a second auxiliary switching unit;

wherein a first contact of the first auxiliary switch unit is electrically connected to a first contact of the second auxiliary switch unit; a second contact of the first auxiliary switch unit is electrically connected to the driving signal output terminal of the fourth driving circuit; a third contact of the first auxiliary switch unit is electrically connected to the driving signal output terminal of the third driving circuit; a second contact of the second auxiliary switch unit is electrically connected to the driving signal output terminal of the third driving circuit; a third contact of the second auxiliary switch unit is electrically connected to the driving signal output terminal of the fourth driving circuit.

7. The bridge rectifier according to claim 1, further comprising:

an operating voltage generating circuit comprising a transformer, a first operating voltage generating component, and a second operating voltage generating component;

wherein the primary side of the transformer is electrically connected to the first switching circuit and the second switching circuit; the secondary side of the transformer is electrically connected to the first operating voltage generating component and the second operating voltage generating component.

8. The bridge rectifier according to claim 1, further comprising:

a first protecting unit electrically connected to the first switching circuit;

a second protecting unit electrically connected to the second switching circuit;

a third protecting unit electrically connected to the third switching circuit; and a fourth protecting unit electrically connected to the fourth switching circuit.

\* \* \* \* \*

UNITED STATES PATENT AND TRADEMARK OFFICE
CERTIFICATE OF CORRECTION

PATENT NO. : 11,258,372 B2
APPLICATION NO. : 16/868995
DATED : February 22, 2022
INVENTOR(S) : Chao Peng et al.

It is certified that error appears in the above-identified patent and that said Letters Patent is hereby corrected as shown below:

On the Title Page

In Column 1, item (73):
Please delete "Umberg Zipser LLP"

Signed and Sealed this
Eighteenth Day of October, 2022

Katherine Kelly Vidal
*Director of the United States Patent and Trademark Office*